(12) United States Patent
Nousiainen et al.

(10) Patent No.: US 9,507,973 B2
(45) Date of Patent: Nov. 29, 2016

(54) DEVICE CAPABLE OF HAVING A PLURALITY OF SIM CARDS

(71) Applicant: UROS TECHNOLOGY S.À.R.L., Ettelbruck (LU)

(72) Inventors: Marko Nousiainen, Oulu (FI); Ilkka Rahikainen, Oulu (FI)

(73) Assignee: UROS TECHNOLOGY S.À R.L., Ettelbruck (LU)

( * ) Notice: Subject to any disclaimer, the term of this patent is extended or adjusted under 35 U.S.C. 154(b) by 0 days.

(21) Appl. No.: 13/738,293

(22) Filed: Jan. 10, 2013

(65) Prior Publication Data
US 2013/0203467 A1    Aug. 8, 2013

(30) Foreign Application Priority Data

Feb. 2, 2012 (EP) .................................... 12153585

(51) Int. Cl.
*H04M 1/02* (2006.01)
*G06K 7/00* (2006.01)
(Continued)

(52) U.S. Cl.
CPC ............. *G06K 7/0073* (2013.01); *G06K 7/003* (2013.01); *H04B 1/3816* (2013.01); *H04B 1/3888* (2013.01); *H04M 1/026* (2013.01); *H04M 1/0249* (2013.01); *H04M 2250/14* (2013.01); *H04M 2250/66* (2013.01)

(58) Field of Classification Search
CPC ............. G06K 7/0034; G06K 7/0021; G06K 7/0073; H05K 5/0291; H04W 8/28; H04B 1/38; H04B 1/3816; H04M 1/02; H04M 1/0202

USPC ........ 455/550.1, 558, 575.1–575.6; 361/737, 361/796, 802; 439/61, 630
See application file for complete search history.

(56) References Cited

U.S. PATENT DOCUMENTS

| | | | |
|---|---|---|---|
| 5,184,282 A * | 2/1993 | Kaneda et al. | 361/737 |
| 2011/0128683 A1* | 6/2011 | Hirao et al. | 361/679.01 |
| 2011/0134620 A1* | 6/2011 | Kang et al. | 361/783 |

FOREIGN PATENT DOCUMENTS

| | | |
|---|---|---|
| DE | 201 19 862 U1 | 3/2002 |
| EP | 1 058 202 A2 | 12/2000 |
| WO | WO 2004/073328 A1 | 8/2004 |

OTHER PUBLICATIONS

Jun. 29, 2012 European Search Report issued in European Patent Application No. EP 12 15 3585.

*Primary Examiner* — George Eng
*Assistant Examiner* — Umair Ahsan
(74) *Attorney, Agent, or Firm* — Oliff PLC (57) ABSTRACT

An apparatus with the middle structure being layered between the first outer structure and the second outer structure. The operational circuitry includes a plurality of pockets for subscriber identity module cards, the pockets being arranged in two parallel rows in a planar fashion. The pockets of each row are placed next to each other and include open sides capable of receiving the subscriber identity module cards. The open sides of the pockets of different rows face in opposite directions. The middle structure includes a plurality of holes in rows for transferring subscriber identity module cards therethrough to the pockets or from the pockets, the holes of the middle structure of different rows facing in opposite directions, and the holes being on the open sides of the pockets.

9 Claims, 10 Drawing Sheets

(51) Int. Cl.
*H04B 1/3888* (2015.01)
*H04B 1/3816* (2015.01)

DEVICE CAPABLE OF HAVING A PLURALITY OF SIM CARDS

FIELD

The invention relates to a device capable of having multiple SIM card.

BACKGROUND

First mobile phones had one subscriber identity module (SIM). Since then the number of SIMs has increased. A present mobile phone may have dual or triple subscriber identity modules (SIM). Although a large number of SIMs brings many advantages, increasing number of SIMs also increases mechanical and designing problems how to arrange many SIMs in a thin and pocket sized device that is all the time carried with in variable and potentially in rough conditions. Hence, there is a need for a portable device capable of accepting a large number of SIMS.

BRIEF DESCRIPTION

According to an aspect of the present invention, there is provided an apparatus as specified in claim 1.

According to another aspect of the invention, there is provided a method specified in claim 11.

The apparatus and method in the presented claims are responses to the need for a portable device capable of accepting a large number of subscriber identity module cards.

LIST OF DRAWINGS

Example embodiments of the present invention are described below, by way of example only, with reference to the accompanying drawings, in which.

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

It should be noted that while FIGS. 1 to 9 illustrate various embodiments of apparatuses, they are simplified block diagrams that only show some structures and functional entities. It is apparent to a person skilled in the art that the described apparatus may also comprise other functions and structures. It should be appreciated that details of some functions, structures, and the protocols used for communication are irrelevant to the actual invention. Therefore, they need not be discussed in more detail here.

Figure 1:
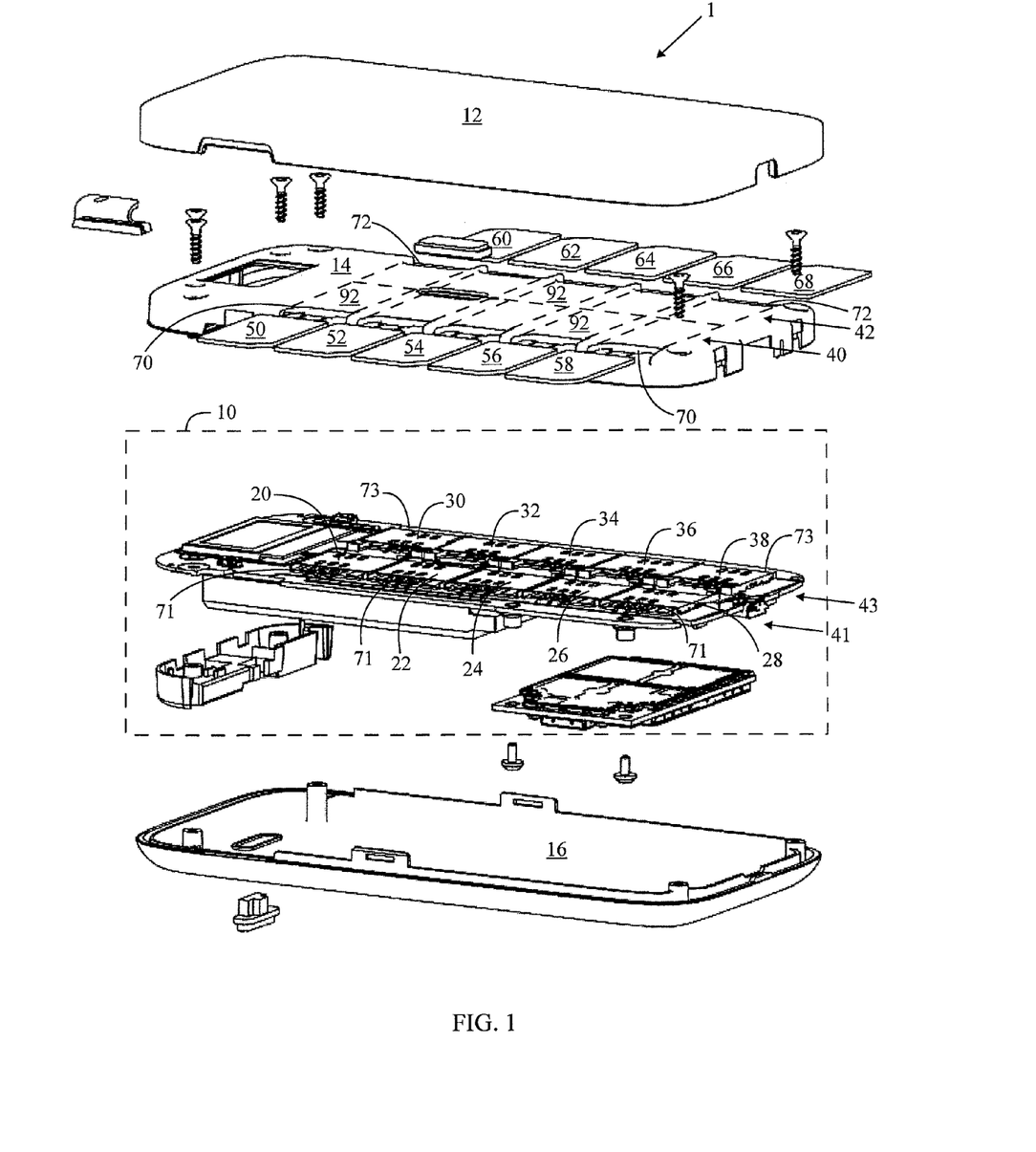
FIGS. 1 to 3 illustrate structural examples embodiments of apparatus.

FIG. 1 is an exploded view drawing of mechanics of apparatus 1. The apparatus 1 comprises an operational circuitry 10, a first outer structure 12, a middle structure 14 and a second outer structure 16. The apparatus 1 may further comprise additional parts. Some of the additional parts may be used to fix the structures 12, 14 and 16 together. Other additional parts may be related to different features of the apparatus 1. The middle structure 14 is layered between the first outer structure 12 and the second outer structure 16. The operational circuitry 10, which may also be placed between the first outer structure 12 and the second outer structure 16, and the structures 12, 14 and 16 may be secured together with screws, rivets, glue and/or with some other means. The first outer structure 12 may be made to be easily attachable to and detachable from the structure of the apparatus 1. The first outer structure 12 may be attached to other parts such as the second outer structure 16, the middle structure 14 and/or the operational circuitry 10 of the apparatus 1 using a bayonet joint, for example which is repeatedly attachable and detachable. In this way, the apparatus 1 may be made thin and pocked sized and the apparatus 1 is thus also portable like present mobile phones, for example. Here thin means a thickness of less than about 2.5 cm, and often 0.5 cm to 2 cm. Other dimensions of the apparatus 1 are defined by the outer structures 12, 16 and they may be about 5 cm to 20 cm×4 cm to 15 cm, for example.

The first outer structure 12 and the second outer structure 16 may form a case of the apparatus 1 such that the operational circuitry 10 and the middle structure 14 are inside the combination of the first outer structure and the second outer structure 16.

The middle structure 14 may comprise or may be made of plastic, composite, ceramics or metal, for example. The first outer structure 12 and the second outer structure 16 may also be made of or comprise plastic, composite, ceramics or metal, for example. The operational circuitry 10 may comprise a circuit board and components attached thereto. The components may be electronical, optical and/or mechanical, for example.

The operational circuitry 10 comprises also pockets 20, 22, 24, 26, 28, 30, 32, 34, 36 and 38 for subscriber identity module cards 50, 52, 54, 56, 58, 60, 62, 64, 66 and 68. The number of pockets 20 to 38 is at least four. The pockets 20 to 38 are arranged in two parallel rows 41, 43 in a planar fashion since operational circuitry 10 is at least almost planar. The open sides 71, 73 of the pockets 20 to 38 of operational circuitry 10 of different rows 41, 43 are configured to face in opposite directions. In this way, a great number of subscriber identity module cards 50 to 68 can be kept in the pockets 20 to 38.

Each pocket 20 to 38 has an empty space the size and shape of which may closely correspond to those of the subscriber identity module cards 50 to 68. The pockets 20 to 38 of each row 41, 43 are placed next to each other. Each pocket 20 to 38 may have electrical contacts electrodes 82 for coupling a subscriber identity module card 50 to 68 with contact pads 84 of the subscriber identity module card 50 to 68. The electrical contacts electrodes 82 are in electrical connection with the operational circuitry 10.

The middle structure 14 may comprise a plurality of holes 70, 72 in rows 40, 42, the rows 40, 42 having a similar configuration to the rows 41, 43 in the operational circuitry 10. The holes 70, 72 are apertures through which the subscriber identity module cards 50 to 68 can be transferred to and/or from the pockets 20 to 38. When transferring in, the subscriber identity module cards 50 to 68 may be inserted in the pockets 20 to 38 and through the holes 70, 72. When transferring out, the subscriber identity module cards 50 to 68 may be drawn out from the pockets 20 to 38 of the operational circuitry 10. The holes 70, 72 of the middle structure 14 of different rows 40, 42 are configured to face in opposite directions. In this way, a great number of subscriber identity module cards 50 to 68 can be inserted in the pockets 20 to 38 easily. The holes 70, 72 are set on the open sides 71, 73 of the pockets 20 to 38.

The subscriber identity module cards 50 to 68 can be inserted in the pockets 20 to 38 when the first outer structure 12 is detached from the apparatus 1. After detachment of the first outer structure 12 it may be fastened back to the apparatus 1.

The middle structure 14 protects the subscriber identity module card pockets on the circuitry 10. The middle structure 14 also protects the operational circuitry 10 of the apparatus 1. The protection may mean mechanical and/or electrical protection. A user may add, remove and/or change subscriber identity module cards 50 to 68 when he/she desires, which, however, may cause mechanical and/or electrical damage to the operational circuitry 10. That means the delicate wires and/or components and their coupling may be damaged because of touch of the user. The user may also cause a short circuit by his touch or the user may also cause an electric discharge of static electricity which all may damage the circuitry of the apparatus 1.

The middle structure 14 as such also provides stiffness to the apparatus 1. In an embodiment according to FIG. 2, the middle structure 14 may additionally comprise sections 80 which are made to be stiffer than the rest of the structure in order to provide further stiffness. In an embodiment, the sections 80 may be thicker than the rest of the structure. In an embodiment, the sections 80 are made of material that is stiffer than the rest of the structure. The shape of the sections 80 may be free.

In an embodiment, the middle structure 14 provides stiffness against at least one of the following: twisting and bending. The apparatus may be exposed to forces that may twist and or bend it. This may take place in a pocket or in a suit-case, for example. Additionally, the middle structure 14 provides stiffness when the apparatus 1 falls down and hits a hard surface such as a floor or a pavement.

That the middle structure 14 is stiff facilitates the manufacturing of the first and second outer structures 12, 16, because they may be made lighter and less stiff. On the other hand, if the first and second outer structures 12, 16 are made according to prior art, the apparatus 1 may be made excessively stiff for rough use with the middle structure 14. It should also be noted that the apparatus 1 remains stiff also when the first outer structure 12 is detached. Still, the apparatus 1 is compact and thin package and may be put in various pockets.

In an embodiment, the middle structure 14 provides mechanical guidance for a subscriber identity module card 50 to 68 when it is input in a pocket 20 to 38.

In an embodiment, the middle structure 14 protects the operational circuitry 10 of the apparatus 1 mechanically and/or electrically.

The middle structure 14 may have such a shape that a subscriber identity module card 50 to 68 enters easily a pocket 20 to 38. For example, a lower part 86 of the middle structure 14 extends longer than an upper part 88 of the middle structure 14. All in all, the shape of the middle structure 14 corresponds to the shape of a subscriber identity module card 50 to 68 such that it guides the subscriber identity module card 50 to 68 while it is inserted in the pocket 20 to 68. The shape of the holes 70, 72 which matches with the shape of the subscriber identity module cards also mitigates the insertion of the subscriber identity module cards. A subscriber identity module card 50 to 68 may lie on the lower part 86 for vertical support when it is inserted in a pocket 20 to 38. A subscriber identity module card 50 to 68 is also easy to push into the pocket 20 to 38 since the upper part 88 enables a finger of the like to be in contact with a subscriber identity module card 50 to 68 up to the point when it is in its final position in the pocket 20 to 38. Additionally, the upper part 88 may have extensions 90 at both sides of each holes 70, 72 which guide a subscriber identity module card 50 to 68 laterally when it is about to be inserted into a pocket 20 to 38.

In an embodiment, each pocket 20 to 38 may comprise contact electrodes 82 capable of making electric contact between said contact electrodes 82 and contact pads 84 of the subscriber identity module card 50 to 68. The places and shapes of subscriber identity module cards 50 to 68, contact pads 84, contact electrodes 82, middle structure 14, operational circuitry 10, first structure 12 and the second structure 16 may differ from that shown in FIGS. 1 to 3.

In an embodiment, the first outer structure 12 may secure the subscriber identity module cards 50 to 68 in their pockets 20 to 38 by preventing the subscriber identity module cards 50 to 68 accidentally moving out from their pockets 20 to 38. Even if a subscriber identity module card 50 to 68 moves outwards or completely out of the pocket 20 to 38, the first outer structure 12 protects it from falling out of the apparatus 1 but the unfortunate subscriber identity module card 50 to 68 remains in the apparatus 1 between the first outer structure 12 and the second outer structure 16.

In an embodiment, the first outer structure 12 is at least partly transparent. Such a property enables a user to see the subscriber identity module cards 50 to 68 in the pockets 20 to 38. Hence, it is easy to see if the subscriber identity module cards 50 to 68 are in their correct places. Additionally, if the subscriber identity module cards 50 to 68 have an identification code on them, it is possible for the user to see if he/she has a proper subscriber identity module card 50 to 68 available for a certain operation he/she wants to perform. The identification code may also be on stickers that are attached on the subscriber identity module cards 50 to 68. In an embodiment, the identification of the subscriber identity module cards 50 to 68 may be seen through the first outer structure 12 because the upper part 88 of the first outer structure 12 doesn't extend so long as the lower part 86.

In an embodiment, the identification code may also be on stickers each of which may be attached on the middle structure 14 adjacent to each pocket. When a sticker is placed next to or above a pocket, the sticker may refer to the subscriber identity module card place or to the pocket. For example, each pocket or opening for it on the middle structure may have its own number (1, 2, 3, and so on).

In an embodiment, the middle structure 14 may have designed information positions 92 (see some reference signs in FIG. 1) which are dedicated for attaching stickers on them. The material or the surface roughness of the position for the stickers may be made such that the glue of the stickers and the surface of the position 92 attach well to each other. The positions 92 may be designed to have a desired surface shape. The shape may curve in a predetermined manner or the shape may be flat.

Figure 3:
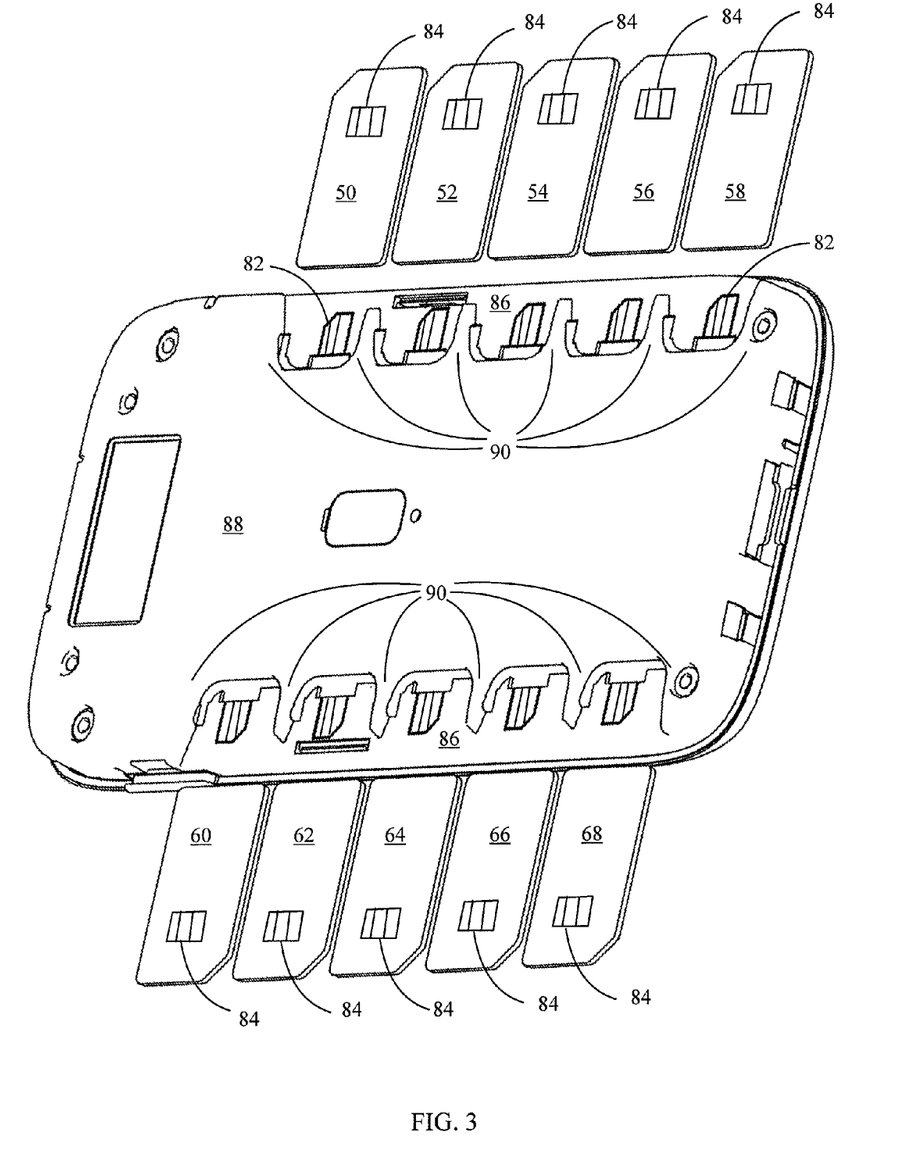
Figure 4:
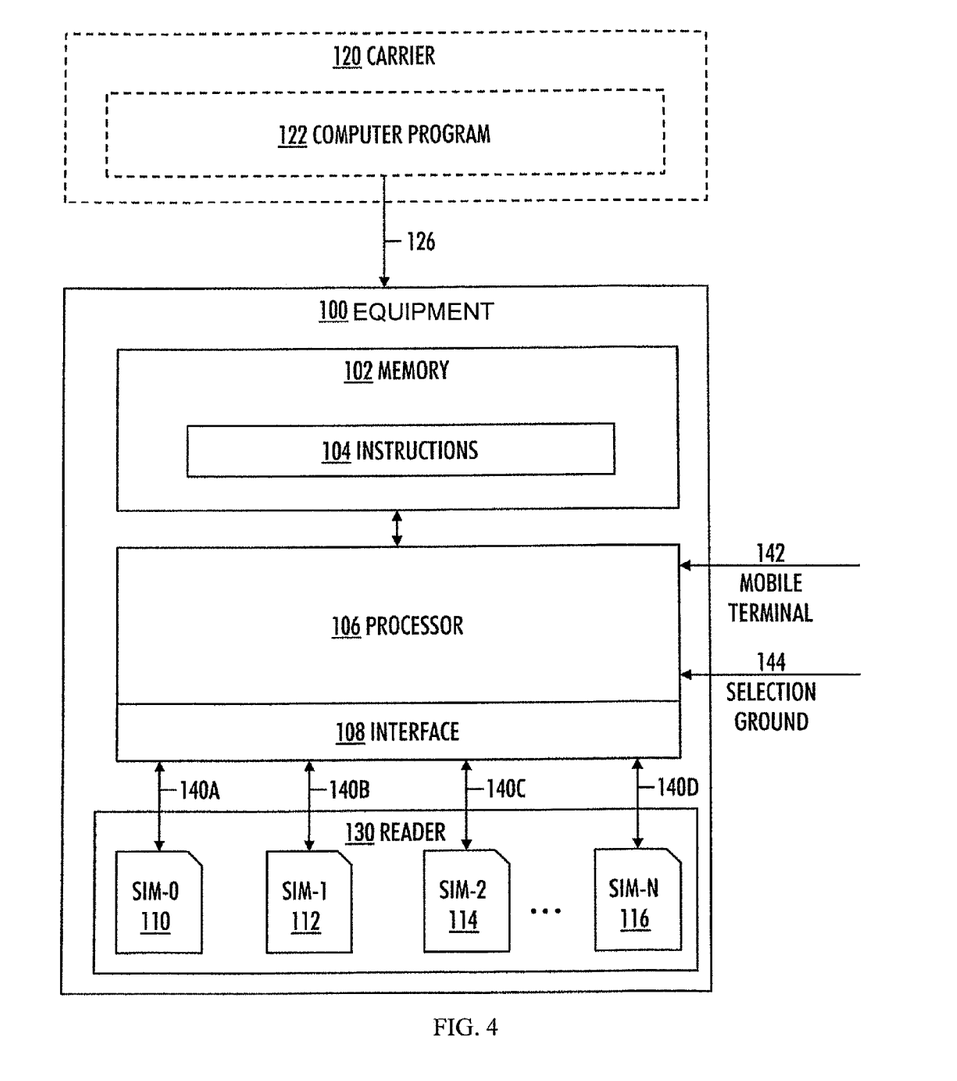
FIG. 4 illustrates equipment comprising the apparatus.

FIG. 4 presents a block diagram of general equipment which may be understood as environment of the apparatus 1 described above. According to an embodiment, equipment 100 may comprise the apparatus 1 described in FIGS. 1 to 3. If the equipment 100 comprises one part like in FIG. 5, the apparatus 1 is the equipment 100. If the equipment 100 comprises two parts like on FIGS. 6, 7 and 8, at least one of the parts is the apparatus 1 described in FIGS. 1 to 3.

The equipment 100 of FIG. 4 may comprise an interface 108 to a set of subscriber identity modules 110, 112, 114, 116 of a wireless communication system. The subscriber identity modules 110, 112, 114, 116 when they reside in the apparatus 1 are operationally active parts (in FIG. 6 subscriber identity module 110 is not in the apparatus 1) of the subscriber identity module cards 50 to 68. The interface 108 may or may not include a (contact) smart card reader 130 capable of reading the subscriber data through the contacts of the integrated circuit.

The number of the subscriber identity modules 110, 112, 114, 116 may vary according to the circumstances, but there are at least four subscriber identity modules. The number of the subscriber identity modules may be 8 to 12, for example. However, the number is not limited to this. One subscriber identity module 110 may be a default subscriber identity module used normally (in user's home location or in a network where he/she has the coverage of the default subscriber identity module, for example). In this example, the number of other subscriber identity modules 112, 114, 116 may vary between 7 to N, wherein N is an integer greater than two. Often the minimum number of the subscriber identity modules (0, 1, 2, . . . , N) is four without limiting to this.

In an example embodiment, the subscriber identity module 110, 112, 114, 116 is an integrated circuit storing subscriber data, which is network-specific information used to authenticate and identify subscribers on the network. The subscriber identity module may be embedded into a removable SIM card 50 to 68. Hence, a SIM card 50 to 68 comprises at least one subscriber identity module and a casing for the at least one subscriber identity module. First SIM cards were of credit card size, 85.60 mm×53.98 mm×0.76 mm, but a newer mini-SIM card is considerably smaller, 25 mm×15 mm×0.76 mm, or a micro-SIM card is even smaller, 15 mm×12 mm×0.76 mm. Naturally, these measures are only example embodiments. It is also to be noted than one physical SIM card may include a number of different subscriptions: one SIM card may be a multi-IMSI SIM card having many different subscriber identities in the same card.

The wireless communication system may be any standard/non-standard/proprietary radio system that supports the use of the subscriber identity modules 110, 112, 114, 116 of the subscriber identity module cards 50 to 68. In the present, such a system may be any mobile telephone system, regardless of the generation (such as 2G, 3G, 4G, beyond 4G, etc.). Consequently, the wireless communication system may be GSM (Global System for Mobile Communications), WCDMA (Wideband Code Division Multiple Access), TD-SCDMA (Time Division Synchronous Code Division Multiple Access), or evolved universal terrestrial radio access (E-UTRA), also known as long term evolution (LTE) for example, or its recent LTE-Advanced versions (LTE-A). However, the example embodiments are not restricted thereto, but may be applicable to other suitable radio systems (in their present forms and/or in their evolution forms), such as universal mobile telecommunications system (UMTS) radio access network (UTRAN or EUTRAN), a system based on International Mobile Telecommunication (IMT) standard or any one of its evolution versions (e.g. IMT-Advanced), wireless local area network (WLAN) based on IEEE (Institute of Electrical and Electronics Engineers) 802.11 standard or its evolution versions (IEEE 802.11ac), worldwide interoperability for microwave access (WiMAX), Wi-Fi, 3GPP, Bluetooth®, or personal communications services (PCS).

The equipment 100 also comprises one or more processors 106, and one or more memories 102 for storing instructions 104. The instructions 104, when executed by the one or more processors 106, cause the equipment 100 to obtain data 140A, 140B, 140C, 140D relating to the subscriber identity modules 110, 112, 114, 116, obtain data 142 relating to a mobile terminal, obtain at least one selection ground 144 for the subscriber identity module, and select at least one optimal subscriber identity module 110, 112, 114, 116 for use by the mobile terminal on the basis of the data 140A, 140B, 140C, 140D relating to the subscriber identity modules, the data 142 relating to the mobile terminal, and the at least one selection ground 144 for the subscriber identity module. With this kind of processing, utilization of many and wide range of subscriber identity modules becomes possible, and, furthermore, selection of the right subscriber identity module becomes user friendly and automatic (or at least semi-automatic if user interaction is required for the selection or its confirmation).

The term 'processor' 106 refers to a device that is capable of processing data. Depending on the processing power needed, the equipment 100 may comprise several processors 106 such as parallel processors or a multicore processor. When designing the implementation of the processor 106, a person skilled in the art will consider the requirements set for the size and power consumption of the equipment 100 of FIG. 4, the necessary processing capacity, production costs, and production volumes, for example. The processor 106 and the memory 102 may be implemented by an electronic circuitry. In an example embodiment, the processor 106 is Freescale™ i.MX233 applications processor such as MCIMX233CJM4C and the memory 102 includes NAND type flash memory such as Micron® MT29F1G08ABADAH4-IT:D, and mobile DDR (=type of double data rate synchronous DRAM) SDRAM such as Micron® MT46H32M16LFBF-6 IT:C.

A non-exhaustive list of implementation techniques for the processor 106 and the memory 102 includes, but is not limited to:
  logic components,
  standard integrated circuits,
  application-specific integrated circuits (ASIC),
  system-on-a-chip (SoC),
  application-specific standard products (ASSP),
  microprocessors,
  digital signal processors,
  special-purpose computer chips, and
  field-programmable gate arrays (FPGA).

The instructions 104 may be implemented by software and/or hardware. In an example embodiment, the software may be written by a suitable programming language (such as C, C++, or Java), and the resulting executable instructions 104 may be stored on the memory 102 and run by the microprocessor 106.

In an example embodiment, the one or more memories 102 may further store instructions 104, that, when executed by the one or more processors 106, cause the equipment 100 to obtain the data relating to the subscriber identity modules 110, 112, 114, 116 by at least one of the following: read the data 140A, 140B, 140C, 140D from the subscriber identity modules 110, 112, 114, 116, receive the data 140A, 140B, 140C, 140D wirelessly from a service provider, receive the data 140A, 140B, 140C, 140D from a user interface manipulated by a user of a mobile terminal.

The data 140A, 140B, 140C, 140D relating to the subscriber identity modules 110, 112, 114, 116 may include, for example, a unique serial number (Integrated Circuit Card Identifier, ICCID) of the SIM card, internationally unique number of the subscriber (International Mobile Subscriber Identity, IMSI), security authentication and ciphering information for the subscriber (such as an authentication key Ki), temporary information related to the local network, a list of the services the subscriber has access to, an operator-specific emergency number, two passwords (personal identification number, PIN, for ordinary use, and PIN unlock code, PUK, for PIN unlocking), and other required data. The subscriber data may also include other carrier-specific data such as the short message service centre (SMSC) number, service provider name (SPN), service dialling numbers (SDN), advice-of-charge parameters, and value added service (VAS) applications. Further information may be found in the GSM Technical Specification 11.11.

Besides being called subscriber identity module, also other names and abbreviations may be used to refer to subscriptions. USIM (Universal Subscriber Identity Module) is an application for UMTS running on a UICC (Universal Integrated Circuit Card). The USIM is a logical entity on the physical subscriber identity module card storing user subscriber information, authentication information, text messages, and phone book contacts. For authentication purposes, the USIM stores a long-term pre-shared secret key, which is shared with the Authentication Center (AuC) in the network. The USIM also verifies a sequence number that must be within a range using a window mechanism to avoid replay attacks, and is in charge of generating the session keys to be used in the confidentiality and integrity algorithms of the KASUMI block cipher in UMTS. The equivalent of USIM on CDMA networks is CSIM.

The service provider is not illustrated in FIG. 4, but the service provider may be an independent supplier of the subscriber identity modules 112, 114, 116 and the equipment 1000 of FIG. 4. The user interface manipulated by the user of the mobile terminal may be a user interface of the mobile terminal.

Various criteria may be used alone or in combination for selecting at least one subscriber identity module in the subscriber identity module cards 50 to 68. A simple selection ground 144 could be formulated as follows: "use the cheapest subscriber identity module 110/112/114/116 of the subscriber identity module cards 50 to 68 that provides the required service at the required quality of service in the present location of the mobile terminal by network operator A if available, and if operator A is not available then by any other operator fulfilling the criteria", but this is only an example embodiment, as the selection ground 144 may be made much simpler but also much more complex.

In an example embodiment, the one or more memories 102 further store instructions 104, that, when executed by the one or more processors 106, cause the equipment 100 to treat at least one of the subscriber identity modules 110 as the default subscriber identity module and to use the at least one default subscriber identity module 110 after start-up of the mobile terminal. The at least one default subscriber identity module 110 may, besides being the starting at least one subscriber identity module, be also the at least one controlling subscriber identity module, and possibly also the at least one back-up subscriber identity module. The mobile terminal may use the at least one default SIM for communication.

In an example embodiment, the equipment 100 may be a mobile wireless communications terminal, a mobile an accessory of a mobile wireless communications terminal, a combination of a mobile wireless communications terminal and an accessory of the mobile wireless communications terminal, an accessory of a mobile terminal, a combination of a mobile terminal and an accessory of the mobile terminal, or a USB (Universal Serial Bus) modem, or any other suitable mobile terminal capable of employing the set of subscriber identity modules 110, 112, 114, 116, such as a mobile phone, a tablet pc, a portable computer, or a computer.

Figure 2:
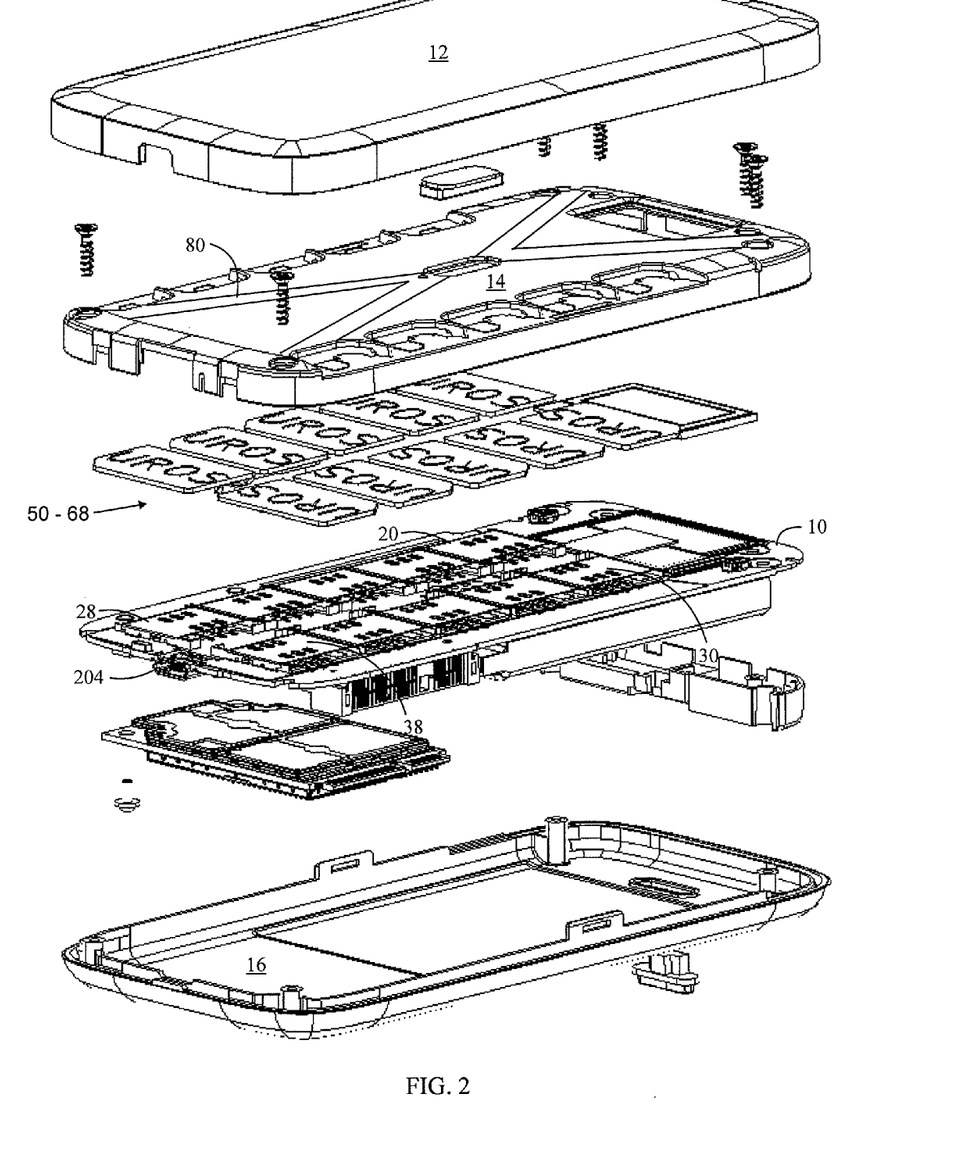
Figure 5:
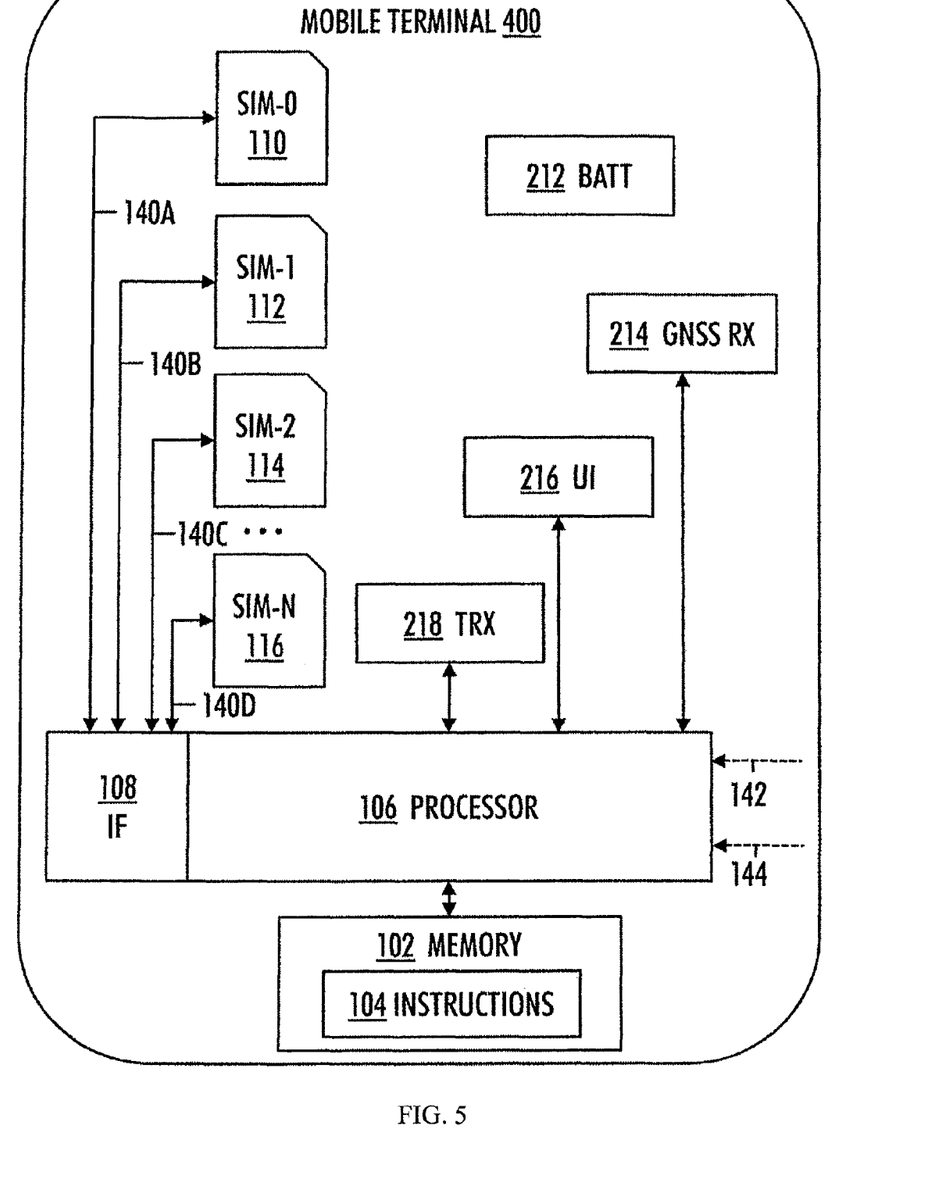
FIG. 5 illustrates the apparatus comprising a mobile terminal.

FIG. 5 illustrates an example embodiment wherein the apparatus 1 of FIGS. 1 to 3 is a mobile terminal 400. In this example, the functionality of the equipment 100 of FIG. 4 is also implemented to the apparatus 1 acting as the mobile terminal 400. Consequently, the mobile terminal 400 comprises the interface 108 to the set of the subscriber identity modules 110, 112, 114, 116 of the wireless communication system, the one or more processors 106, and the one or more memories 102 storing the instructions 104. The instructions 104, when executed by the one or more processors 106, cause the mobile terminal 400 to obtain data 140A, 140B, 140C, 140D relating to the subscriber identity modules 110, 112, 114, 116 through the interface 108, obtain data 142 relating to the mobile terminal 400, obtain at least one selection ground 144 for the subscriber identity module, and select at least one optimal subscriber identity module for use by the mobile terminal 400 on the basis of the data 140A, 140B, 140C, 140D relating to the subscriber identity modules 110, 112, 114, 116, the data 142 relating to the mobile terminal 400, and the at least one selection ground 144 for the subscriber identity module. The mobile terminal 400 may also comprise at least some of other parts 212, 214, 216, 218 as shown in FIG. 5, but explained in relation to FIG. 6.

Figure 6:
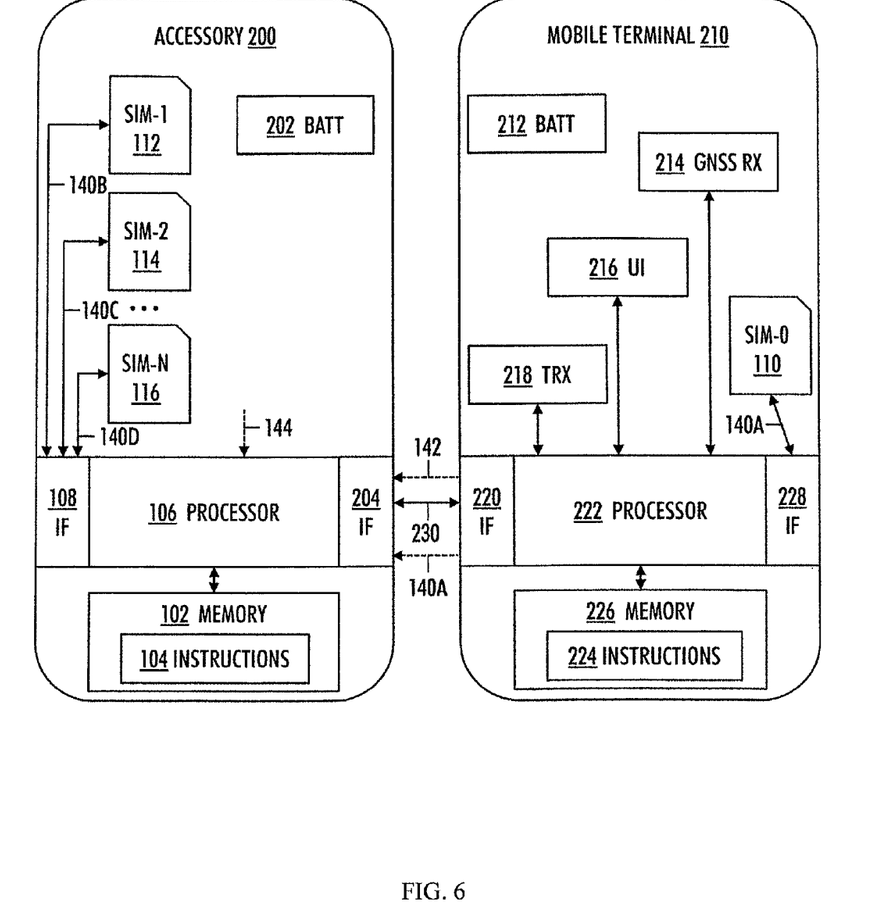
FIGS. 6 to 8 illustrate the apparatus as an accessory of a mobile terminal.

FIG. 6 illustrates an example embodiment wherein the equipment 100 of FIG. 4 functionality is implemented in an accessory 200 of a mobile terminal 210. In this example, the apparatus 1 of FIGS. 1 to 3 is the accessory 200. Consequently, the accessory 200 comprises the set of the subscriber identity modules 112, 114, 116 of the subscriber identity module cards 50 to 68, and the at least one processor 106 and at least one memory 102 with the instructions 104. The subscriber identity module card of the subscriber identity module 110 may also be taken out from the mobile terminal 210 and inserted to a pocket 20 to 38 of the accessory 200.

The accessory 200 may or may not comprise a battery 202, depending on the power requirements of the accessory 200 and the possibility to obtain electric energy from an external source such as the mobile terminal 210. The (rechargeable) electrical battery 202 is one or more electrochemical cells that convert stored chemical energy into electrical energy. Instead of battery 202, other suitable accumulator means may be used to store energy.

The interface 108 to the subscriber identity modules 110, 112, 114, 116 is within the accessory 200, but also another interface 228 to the subscriber identity module 110 possibly located in the mobile terminal 210 may be needed.

Furthermore, both the mobile terminal 210 and the accessory 200 comprise a wired or wireless communication protocol interface 204, 220 which may be standard or proprietary. The communication protocol interface 204, 220 enables two-way communication 230 between the mobile terminal 210 and the accessory 200. In an example embodiment, the interface 204, 220 is implemented as a serial or parallel communication bus, hardware line, an USB (Universal Serial Bus) cable with appropriate connectors, a SIM bus according to ISO/IEC 7816-3, a wireless Bluetooth link, a wireless WLAN (Wireless Local Area Network) link, a wireless Wi-Fi (Wireless Fidelity) link, a serial bus such as UART (Universal Asynchronous Receiver/Transmitter), I²C (Inter-Integrated Circuit) or SPI (System Packet Interface). The data 140A relating to the subscriber identity module 110 and the data 142 relating to the mobile terminal 210 may be transferred from the mobile terminal 210 to the accessory 200 through the interfaces 204, 220.

The instructions 104, when executed by the one or more processors 106 of the accessory 200, cause the accessory 200 to obtain the data 140A, 140B, 140C, 140D relating to the subscriber identity modules 110, 112, 114, 116, obtain the data 142 relating to the mobile terminal 210, obtain at least one selection ground 144 for the subscriber identity module, and select at least one optimal subscriber identity module 110, 112, 114, 116 for use by the mobile terminal 210 on the basis of the data 140A, 140B, 140C, 140D relating to the subscriber identity modules, the data 142 relating to the mobile terminal 210, and the at least one selection ground 144 for the subscriber identity module.

In an example embodiment, the mobile terminal 210 may be a mobile wireless communications terminal employing a transceiver 218 capable of communicating with a wireless communication system. In an example embodiment, the mobile terminal 210 may be a mobile phone comprising the default subscriber identity module 110, a user interface 216, a battery 212, at least one processor 222 and at least one memory 226 with instructions 224.

The user interface 216 may comprise a display, means for producing sound, a mechanical input means or the like. The display may be a liquid crystal display, an active-matrix of light-emitting diodes or the like, and it may be a touch screen. The means for producing sound may be a loudspeaker or a simpler means for producing beeps or other sound signals. The mechanical input means may comprise a QWERTY keyboard, a keypad and/or a few movable buttons. A parameter, setting or command relating to the described processing of the subscriber identity modules 110, 112, 114, 116 may be manipulated with the user interface 216.

Furthermore, the mobile terminal 210 may comprise a positioning receiver 214 receiving external location information, which may be utilized to generate location of the mobile terminal 210. The positioning receiver 214 may be a receiver of the Global Positioning System (GPS), the Global Navigation Satellite System (GLONASS), the Galileo Positioning System (Galileo), the Beidou Navigation System, The Quasi-Zenith Satellite System (QZSS), or the Indian Regional Navigational Satellite System (IRNSS), for example. Besides global navigation satellites, the positioning receiver 214 may also determine its location by utilizing other known positioning techniques. It is well known that by receiving radio signals from several different base stations, a mobile phone may determine its location, for example.

In the example embodiment of FIG. 6, the accessory 200 does not comprise a user interface of its own, but the user interaction is performed through the user interface 216 of the mobile terminal 210 as data may be transferred between the accessory 200 and the mobile terminal 210 through the interfaces 204, 220. However, in another example embodiment, the accessory 200 may comprise a user interface as well for outputting and/or inputting data relating to the described processing of the subscriber identity modules 110, 112, 114, 116 of the subscriber identity module cards 50 to 68.

In the example embodiment of FIG. 6, the equipment 100 of FIG. 4 functionality may be implemented in the accessory 200 such that the instructions 104 are run in the at least one processor 106 of the accessory 200. However, also such an example embodiment is feasible wherein a part of the equipment 100 of FIG. 4 functionality is implemented in the mobile terminal 210 as well such that a part of the instructions 104 are also run in the at least one processor 222 of the mobile terminal 210.

Figure 7:
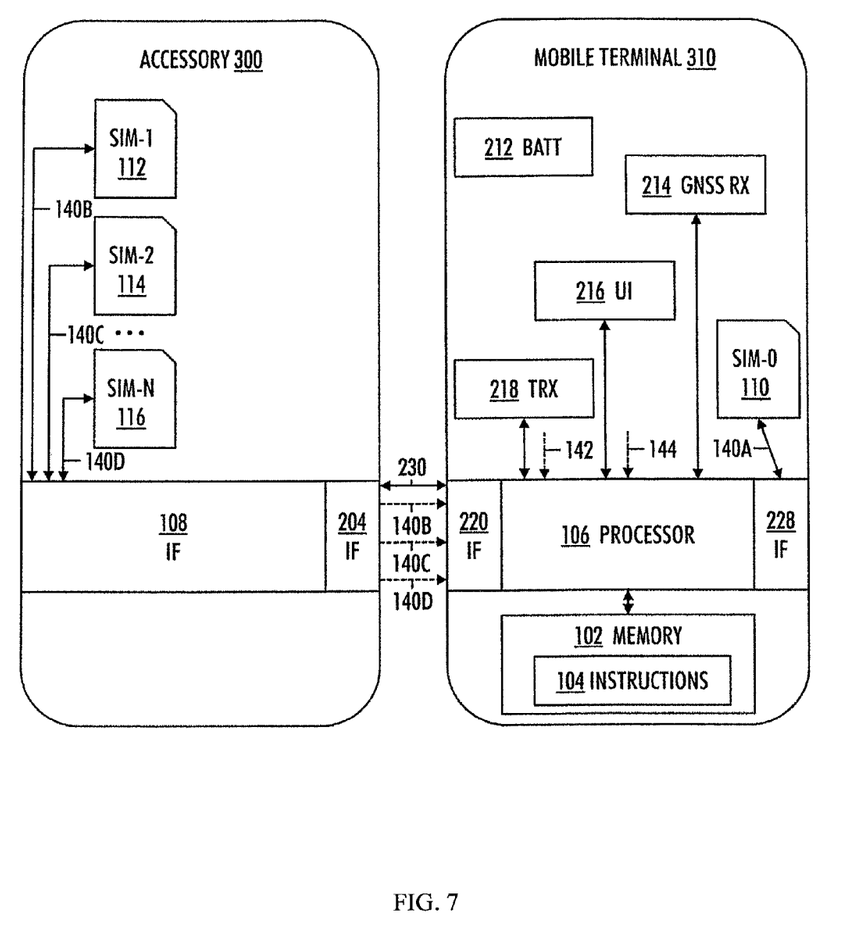

FIG. 7 illustrates an example embodiment wherein the equipment 100 of FIG. 4 functionality is divided between an accessory 300 of a mobile terminal 310 and the mobile terminal 310. In this example, the accessory 300 is the apparatus 1 of FIGS. 1 to 3. Consequently, the accessory 300 comprises the set of the subscriber identity modules 112, 114, 116 of the subscriber identity module cards 50 to 68. The interface 108 to the subscriber identity modules 110, 112, 114, 116 is within the accessory 300, but also another interface 228 to the subscriber identity module 110 possibly located in the mobile terminal 310 may be needed. But, as shown in FIG. 7, the accessory 300 does not require a processor or a memory.

The mobile terminal 310 comprises the at least one processor 106 and at least one memory 102 with the instructions 104, and also the other parts 110, 212, 214, 216, 218, 220, 228 as shown in FIG. 7, and explained in relation to FIG. 6.

In the example embodiment of FIG. 7, the accessory 300 is a kind of container including the extra subscriber identity modules 112, 114, 116 of the subscriber identity module cards 50 to 68 to be used by the mobile terminal 310, but the required processing is performed only in the at least one processor 106 of the mobile terminal 310.

The data 140B, 140C, 140D relating to the subscriber identity modules 112, 114, 116 may be transferred from the accessory 300 to the mobile terminal 310 through the interfaces 204, 220.

The instructions 104, when executed by the one or more processors 106 of the mobile terminal 310, cause the mobile terminal 310 to obtain the data 140A, 140B, 140C, 140D relating to the subscriber identity modules 110, 112, 114, 116, obtain the data 142 relating to the mobile terminal 210, obtain at least one selection ground 144 for the subscriber identity module, and select at least one optimal subscriber identity module 110, 112, 114, 116 for use by the mobile terminal 210 on the basis of the data 140A, 140B, 140C, 140D relating to the subscriber identity modules, the data 142 relating to the mobile terminal 210, and the at least one selection ground 144 for the subscriber identity module.

Figure 8:
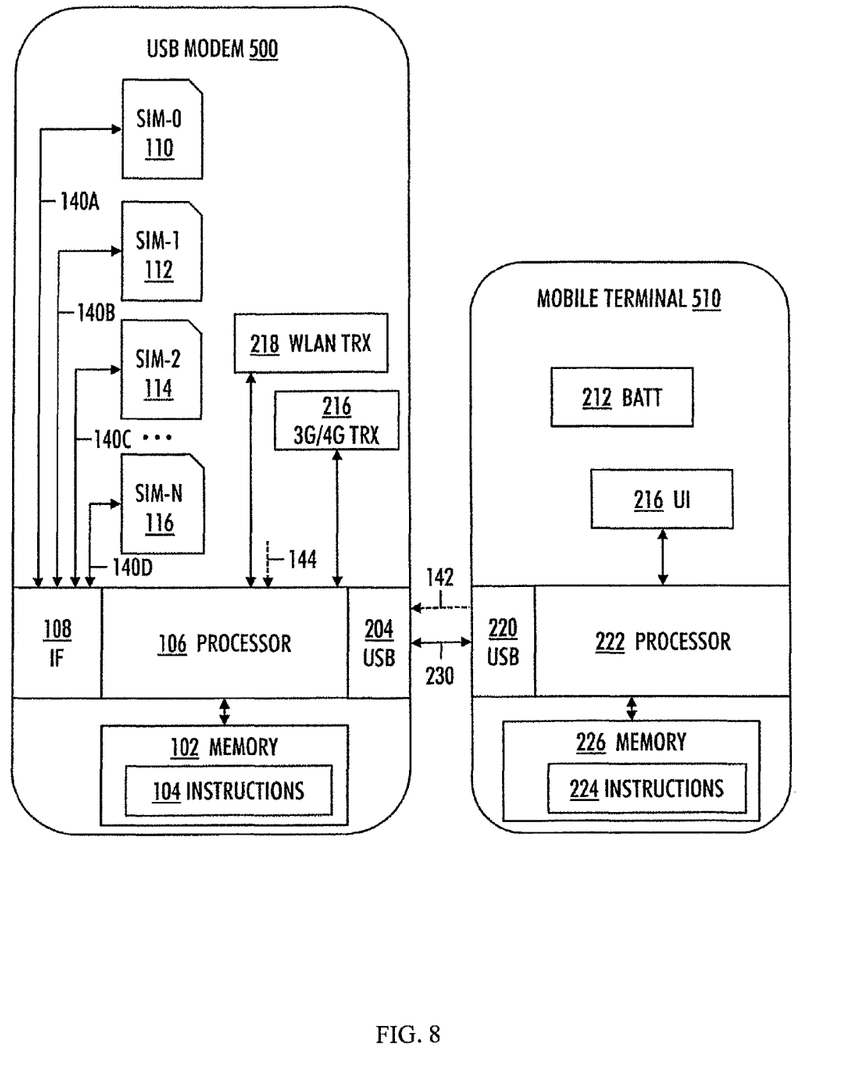

FIG. 8 illustrates an example embodiment wherein the functionality of the equipment 100 of FIG. 4 is implemented in a USB (Universal Serial Bus) modem 500. In this example, the apparatus 1 of FIGS. 1 to 3 is the USB modem 500 which may be used as an accessory of a mobile terminal 510. Consequently, the USB modem 500 comprises the set of the subscriber identity modules 110, 112, 114, 116 of the subscriber identity module cards 50 to 68, the interface 108 to the subscriber identity modules 110, 112, 114, 116, the at least one processor 106, and at least one memory 102 with the instructions 104.

The USB modem 500 may or may not comprise a battery, depending on the power requirements of the USB modem 500 and the possibility to obtain electric energy from an external source such as a mobile terminal 510.

Furthermore, the USB modem 500 comprises a USB interface 204 capable of being coupled 230 through a USB cable and appropriate connectors to a USB interface 220 of the mobile terminal 510. The data 142 relating to the mobile terminal 510 may be transferred from the mobile terminal 510 to the USB modem 500 through the interfaces 204, 220.

The instructions 104, when executed by the one or more processors 106 of the USB modem 500, cause the USB modem 500 to obtain the data 140A, 140B, 140C, 140D relating to the subscriber identity modules 110, 112, 114, 116, obtain the data 142 relating to the mobile terminal 510, obtain at least one selection ground 144 for the subscriber identity module, and select at least one optimal subscriber identity module 110, 112, 114, 116 for use by the mobile terminal 510 on the basis of the data 140A, 140B, 140C, 140D relating to the subscriber identity modules, the data 142 relating to the mobile terminal 510, and the at least one selection ground 144 for the subscriber identity module.

In an example embodiment, the mobile terminal 510 may be a portable computer, a tablet computer, or any other suitable mobile terminal capable of employing the set of subscriber identity modules 110, 112, 114, 116, but not necessarily itself including a transceiver capable of communicating with a wireless communication system. Consequently, the mobile terminal 510 may only comprise the battery 212 and the user interface 216 of the other parts of the mobile terminal 210 illustrated in FIG. 6.

In the example embodiment of FIG. 8, the equipment 100 of FIG. 4 functionality may be implemented in the USB modem 500 such that the instructions 104 are run in the at least one processor 106 of the USB modem 500. However, also such an example embodiment is feasible wherein a part of the equipment 100 of FIG. 4 functionality is implemented in the mobile terminal 510 as well such that a part of the instructions 104 are also run in at least one processor 222 of the mobile terminal 510 besides the other instructions 224 stored in at least one memory 226 of the mobile terminal 510.

Figure 9:
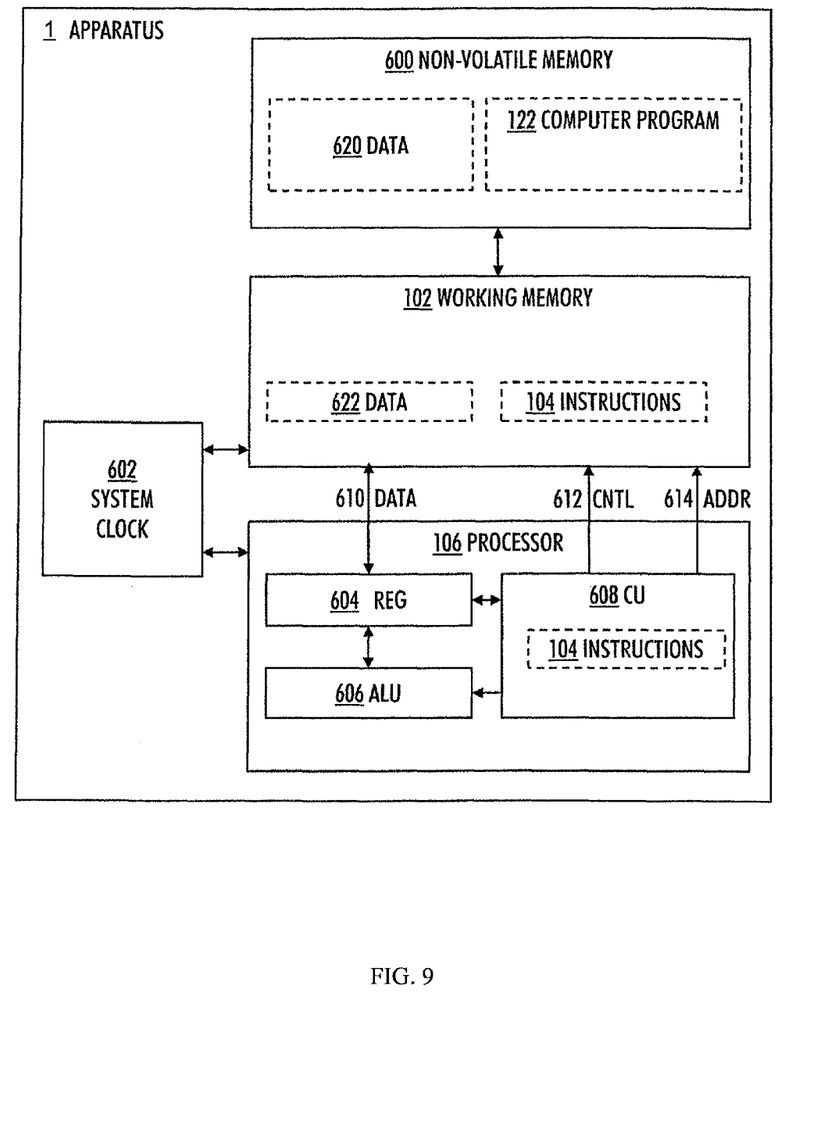
FIG. 9 illustrates the apparatus comprising a computer.

FIG. 9 shows an electronic digital computer which is an example of the equipment 100 of FIG. 4 and may also be an example of the apparatus 1 of FIGS. 1 to 3. The electronic digital computer, which may comprise, besides the processor 106 and the (working) memory 102, a non-volatile memory 600, and a system clock 602. Naturally, the computer may comprise a number of other peripheral devices, not illustrated here for the sake of clarity.

In an example embodiment, the system clock 602 constantly generates a stream of electrical pulses, which cause the various transferring operations within the computer to take place in an orderly manner and with specific timing.

In an example embodiment, the processor 106 may be implemented as a microprocessor implementing functions of a central processing unit (CPU) on an integrated circuit. The CPU is a logic machine executing a computer program 122, which comprises the program instructions 104. The instructions 104 may be coded as a computer program using a programming language, which may be a high-level programming language, such as C, or Java, or a low-level programming language, such as a machine language, or an assembler. The CPU may comprise a set of registers 604, an arithmetic logic unit (ALU) 606, and a control unit (CU) 608. The control unit 608 is controlled by a sequence of instructions 104 transferred to the CPU from the working memory 102. The control unit 608 may contain a number of microinstructions for basic operations. The implementation of the microinstructions may vary, depending on the CPU design. The microprocessor 106 may also have an operating system (a dedicated operating system of an embedded system, or a real-time operating system), which may provide the computer program 122 with system services.

In an example embodiment, there may be three different types of buses between the working memory 102 and the processor 106: a data bus 610, a control bus 612, and an address bus 614. The control unit 608 uses the control bus 612 to set the working memory 102 in two states, one for writing data into the working memory 102, and the other for reading data from the working memory 102. The control unit 608 uses the address bus 614 to send to the working memory 102 address signals for addressing specified portions of the memory in writing and reading states. The data bus 610 is used to transfer data 622, such as data 140A, 140B, 140C, 140D, 142, 144, from the working memory 102 to the processor 106 and from the processor 106 to the working memory 102, and to transfer the instructions 104 from the working memory 102 to the processor 106. During running of the program 122, the instructions 104 are transferred via the data bus 610 from the working memory 102 into the control unit 608, wherein usually a portion of the instructions 104 resides and controls the operation of the equipment 100 of FIG. 4.

In an example embodiment, the working memory 102 may be implemented as a random-access memory (RAM), where the information is lost after the power is switched off. The RAM is capable of returning any piece of data in a constant time, regardless of its physical location and whether or not it is related to the previous piece of data. The data may comprise data 140A, 140B, 140C, 140D, 142, 144 and any other permanent or temporary data needed during the processing, program instructions etc.

In an example embodiment, the non-volatile memory 600 retains the stored information even when not powered. Examples of non-volatile memory include read-only memory (ROM), flash memory, magnetic computer storage devices such as hard disk drives, and optical discs. As is shown in FIG. 9, the non-volatile memory 600 may store both data 620 and the computer program 122 comprising the instructions 104.

An example embodiment provides a computer program 122 comprising the instructions 104 which, when loaded 126 into the equipment 100 of FIG. 4, cause the equipment 100 of FIG. 4 to obtain data 140A, 140B, 140C, 140D relating to the subscriber identity modules 110, 112, 114, 116 in subscriber identity module cards 50 to 68, obtain data 142 relating to a mobile terminal, obtain at least one selection ground 144 for the subscriber identity module, and select at least one optimal subscriber identity module 110, 112, 114, 116 for use by the mobile terminal on the basis of the data 140A, 140B, 140C, 140D relating to the subscriber identity modules, the data 142 relating to the mobile terminal, and the at least one selection ground 144 for the subscriber identity module.

In an example embodiment, the computer program 122 may be in source code form, object code form, or in some intermediate form. The computer program 122 may be stored in a carrier 120, which may be any entity or device capable of carrying the program 122 to the equipment 100 of FIG. 4. The carrier 120 may be a computer-readable storage medium. Besides this, the carrier 120 may be implemented as follows, for example: the computer program 122 may be embodied on a record medium, stored in a computer memory, embodied in a read-only memory, and/or embodied on a software distribution medium. The carrier 120 may also be carried on the telecommunications signal. The medium 120 may be a non-transitory computer-readable storage medium.

FIG. 4 illustrates an example embodiment in which the carrier 120 may be coupled 126 with the equipment 100 of FIG. 4, whereupon the program 122 comprising the instructions 104 is transferred into the (working) memory 102, and possibly also into the non-volatile memory 600. The program 122 with its instructions 104 may be loaded from the non-volatile memory 600 into the working memory 102 as needed.

Figure 10:
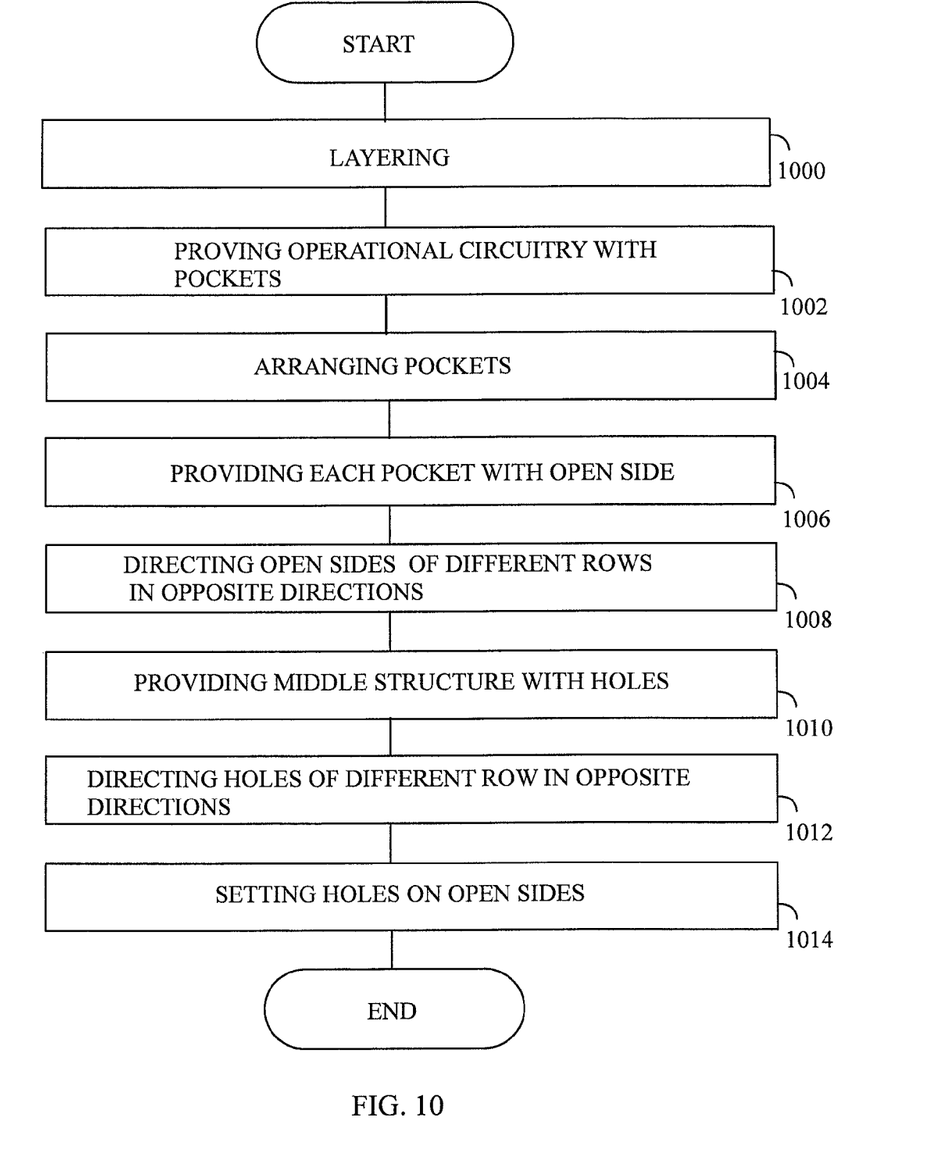
FIG. 10 presents a flow chart of a manufacturing method.

FIG. 10 presents flow chart of a manufacturing method. In step 1000, an operational circuitry 10, a middle structure 14, a first outer structure 12 and a second outer structure 16 are layered by setting the middle structure 14 between the first outer structure 12 and the second outer structure 16. In step 1002, operational circuitry (10) with a plurality of pockets 20 to 38 is provided for subscriber identity module cards (50 to 68). In step 1004, the pockets 20 to 38 are arranged next to each other in two parallel rows 41, 43 in a planar fashion. In step 1006, each pocket 20 to 38 is provided with an open side 71, 73 capable of receiving the subscriber identity module card 50 to 68. In step 1008, the open sides 71, 73 of the pockets 20 to 38 of different rows 41, 43 are directed in opposite directions. In step 1010, the middle structure 14 is provided with a plurality of holes 70, 72 in rows 40, 42 for transferring subscriber identity module cards 50 to 68 therethrough to the pockets 20 to 38 or from the pockets 20 to 38. In step 1012, the holes 70, 72 of the middle structure 14 of different rows 40, 42 are directed in opposite directions. In step 1014, holes 70, 72 of the middle structure 14 and the open sides 71, 73 of the pockets 20 to 38 are set on each other. The order of the steps may vary.

There are many ways to structure the program 122. In an example embodiment, the operations of the program may be divided into functional modules, sub-routines, methods, classes, objects, applets, macros, etc., depending on the software design methodology and the programming language used. In modern programming environments, there are software libraries, i.e. compilations of ready-made functions, which may be utilized by the program for performing a wide variety of standard operations.

Wireless communication devices develop rapidly. Therefore, all words and expressions should be interpreted broadly and they are intended to illustrate, not to restrict, the embodiments presented above. It will be obvious to a person skilled in the art that, as technology advances, the inventive concept can be implemented in various ways. The invention and its embodiments are not limited to the examples described above but may vary within the scope of the claims.

The invention claimed is:

1. An apparatus for accepting multiple numbers of subscriber identity module cards, the apparatus comprising:
    an operational circuitry including a printed circuit board and a plurality of pockets for the subscriber identity module cards, the pockets being arranged in two parallel rows in a planar arrangement, the pockets of each row being placed next to each other and include open sides capable of receiving the subscriber identity module cards, the open sides of the pockets of different rows being configured to face in opposite directions;
    a first outer structure configured to detach from the apparatus in order to insert the subscriber identity module cards in the apparatus;
    a middle structure including a plurality of holes arranged in rows for transferring the subscriber identity module cards through the holes to the pockets or from the pockets, the holes of the middle structure of different rows being configured to face in opposite directions, and the holes being on the open sides of the pockets, the middle structure being layered between the first outer structure and the operational circuitry, and the middle structure being configured to: (i) protect the operational circuitry of the apparatus, (ii) provide stiffness to the apparatus, and provide mechanical guidance for transferring a subscriber identity module card to and/or from a pocket; and
    a second outer structure configured to detachably connect to the first outer structure, wherein:
        the middle structure and the operational circuitry are layered between the first outer structure and the second outer structure, the combination of the first outer structure and the second outer structure forming a case for the apparatus inside which the operational circuitry and the middle structure reside;
        the first outer structure is configured to secure the subscriber identity module cards in the apparatus by preventing the subscriber identity module cards from accidentally: (i) moving out of the apparatus and (ii) moving out from between the first outer structure and the second outer structure, when the subscriber identity module cards move out from each of the plurality of the pockets through each of the plurality of the holes of the middle structure;
        the middle structure, the operational circuitry and the second outer structure are non-detachably secured to each other; and
        the middle structure is made of at least one of plastic, composite, ceramics, and metal.

2. The apparatus of claim 1, wherein the middle structure further includes at least one information position, the at least one information position being adjacent to at least one of the plurality of pockets for attaching a sticker with information on at least one of the subscriber identity module cards in the adjacent pocket on to the at least one information position.

3. The apparatus of claim 1, wherein the middle structure is further configured to protect the operational circuitry of the apparatus mechanically.

4. The apparatus of claim 1, wherein the middle structure is further configured to provide stiffness against at least one of the following: twisting and bending.

5. The apparatus of claim 1, wherein the apparatus further comprises a mobile terminal.

6. The apparatus of claim 1, wherein the apparatus further comprises a computer.

7. The apparatus of claim 1, wherein the apparatus further comprises an accessory for a mobile terminal.

8. The apparatus of claim 1, wherein the apparatus further comprises a communication protocol interface for communication between a mobile terminal and the apparatus.

9. A method of manufacturing an apparatus for accepting multiple numbers of subscriber identity module cards, the method comprising:
    layering an operational circuitry, a middle structure, a first outer structure and a second outer structure by setting the middle structure and the operational circuitry between the first outer structure and the second outer structure, the combination of the first outer structure and the second outer structure forming a case for the apparatus inside which the operational circuitry and the middle structure reside, the second outer structure being configured to detachably connect to the first outer structure;

providing the operational circuitry with a printed circuit board and a plurality of pockets, each of the plurality of pockets being configured to hold a subscriber identity module card;

arranging the pockets next to each other in two parallel rows in a planar fashion;

providing each pocket with an open side capable of receiving the subscriber identity module card;

directing the open sides of the pockets of different rows in opposite directions;

providing the middle structure with a plurality of holes arranged in rows for transferring subscriber identity module cards through the plurality of holes to the pockets or from the pockets, the middle structure being layered between the first outer structure and the operational circuitry, and the middle structure being configured to: (i) protect the operational circuitry of the apparatus, (ii) provide stiffness to the apparatus, and (iii) provide mechanical guidance for transferring subscriber identity module card to and/or from a pocket;

directing the holes of the middle structure of different rows in opposite directions;

setting holes of the middle structure and the open sides of the pockets on each other; and configuring the first outer structure to: (1) be detached from the apparatus for inserting the subscriber identity module cards in the apparatus, and (2) secure the subscriber identity module cards in the apparatus by preventing the subscriber identity module cards from accidentally: (i) moving out of the apparatus and (ii) moving out from between the first outer structure and the second outer structure, when the subscriber identity module cards move out from each of the plurality of the pockets through each of the plurality of the holes of the middle structure, wherein:

the middle structure, the operational circuitry and the second outer structure being non-detachably secured to each other; and the middle structure is made of at least one of: plastic, composite, ceramics, and metal.

* * * * *